(12) United States Patent
Winner et al.

(10) Patent No.: US 6,273,204 B1
(45) Date of Patent: Aug. 14, 2001

(54) METHOD AND ARRANGEMENT FOR CONTROLLING THE SPEED OF A VEHICLE

(75) Inventors: Hermann Winner, Karlsruhe; Stefan Witte, Minden, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/476,362

(22) Filed: Jan. 3, 2000

Related U.S. Application Data

(63) Continuation of application No. 08/941,376, filed on Sep. 30, 1997, now abandoned.

(30) Foreign Application Priority Data

Oct. 2, 1996 (DE) ............................................. 196 40 694

(51) Int. Cl.[7] .................................................. B60K 31/00
(52) U.S. Cl. ............................................. 180/170; 701/96
(58) Field of Search ....................... 701/96, 93; 180/169, 180/170, 171; 318/587; 340/435

(56) References Cited

U.S. PATENT DOCUMENTS

| 4,622,636 | 11/1986 | Tachibana . | |
| 4,930,084 | 5/1990 | Hosaka et al. | 180/170 |
| 5,014,200 | 5/1991 | Chundrick et al. | 180/170 |
| 5,197,562 | 3/1993 | Kakinami et al. | 180/170 |
| 5,357,438 | 10/1994 | Davidian | 701/96 |
| 5,375,060 | 12/1994 | Nocker | 180/170 |
| 5,396,426 | 3/1995 | Hibino et al. | 180/170 |
| 5,400,864 | 3/1995 | Winner et al. | 180/169 |
| 5,420,792 | * 5/1995 | Butsuen et al. | 180/169 X |
| 5,529,139 | * 6/1996 | Kurahashi et al. | 180/169 |
| 5,566,582 | 10/1996 | Beadle et al. | 180/336 |
| 5,670,953 | 9/1997 | Satoh et al. | 180/170 |
| 5,839,534 | 11/1998 | Chakraborty et al. | 180/170 |
| 5,871,062 | * 2/1999 | Desens et al. | 180/169 |
| 6,058,347 | * 5/2000 | Yamamura et al. | 701/96 |
| 6,081,762 | * 6/2000 | Richardson et al. | 701/93 |
| 6,081,763 | * 6/2000 | Smith et al. | 701/93 |
| 6,188,949 | * 2/2001 | Hahn et al. | 701/93 |

FOREIGN PATENT DOCUMENTS

| 4338399 | 5/1995 | (DE) . |
| 0624488 | 11/1994 | (EP) . |

* cited by examiner

Primary Examiner—Anne Marie Boehler
Assistant Examiner—Bryan Fischmann
(74) Attorney, Agent, or Firm—Walter Ottesen

(57) ABSTRACT

The invention is directed to a method and an arrangement for controlling the road speed of a vehicle. In this method and arrangement, the limitation of the speed change of the vehicle is cancelled or set to higher values in dependence upon the dynamic performance of the vehicle wanted by the driver and especially in dependence upon the switching state of at least one element, which is actuable by the driver.

5 Claims, 3 Drawing Sheets

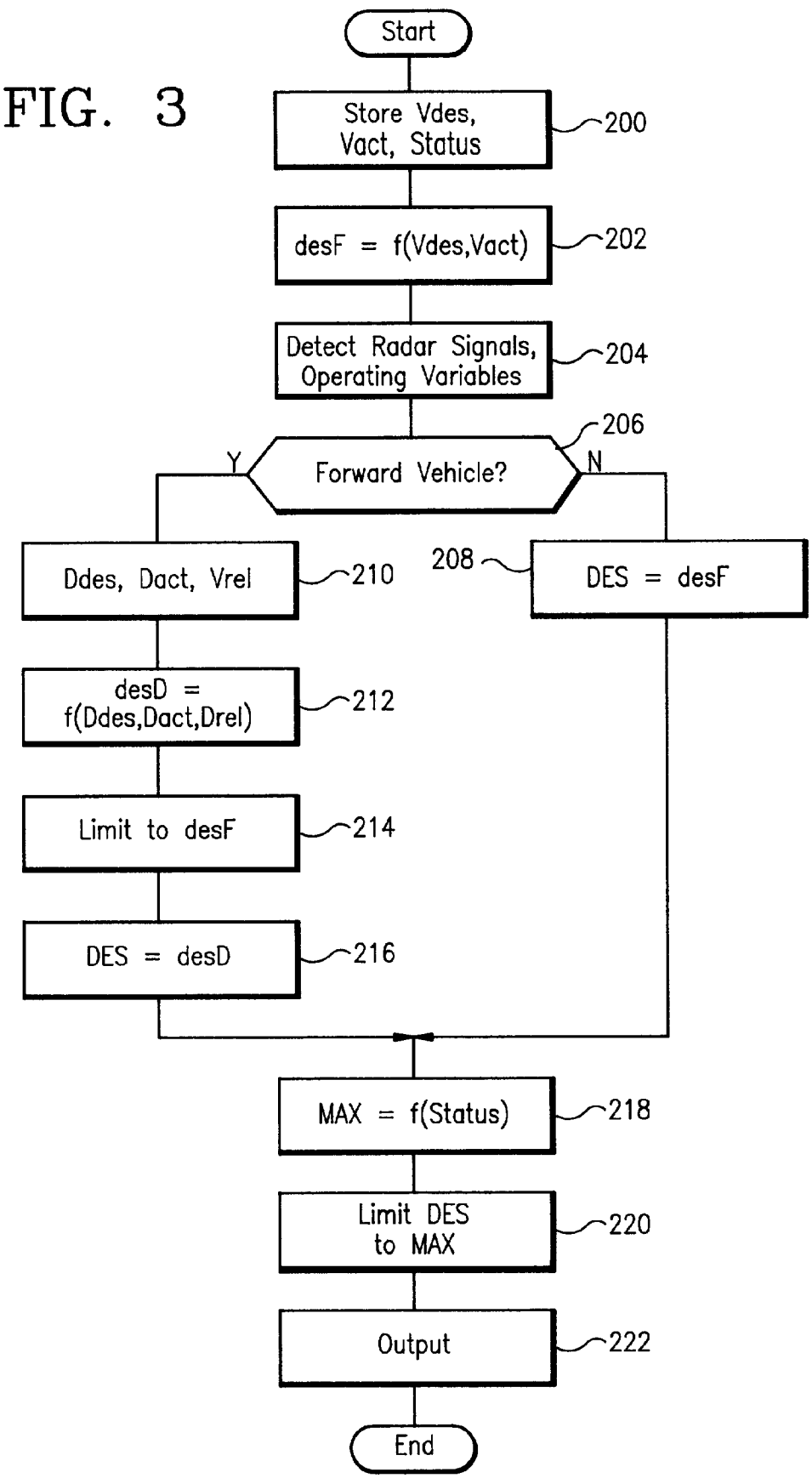

METHOD AND ARRANGEMENT FOR CONTROLLING THE SPEED OF A VEHICLE

This is a continuation of application Ser. No. 08/941,376, filed Sep. 30, 1997, now abandoned.

BACKGROUND OF THE INVENTION

Methods and arrangements for controlling the speed of vehicles are known from the state of the art in many variations. For example, SAE Paper No. 961010 entitled "Adaptive Cruise Control, System Aspects and Development Trends" (1996) discloses a road-speed controller which takes into account the distance to the vehicle ahead. The driver inputs the desired speed of the vehicle via an operator adjustable lever with the functions which are customary for road-speed controllers, such as set speed, resume speed, accelerate, et cetera. The desired speed is controlled in a manner comparable to a conventional vehicle road-speed controller when a forward vehicle is not present in that a desired acceleration is computed from the difference between the desired and driving speeds. If a radar system detects a forward vehicle, then the distance and the relative speed to this vehicle are determined. The control task in this case is that the relative speed is controlled to zero and simultaneously a desired spacing is maintained which is dependent upon speed. Parameters for determining the desired distance (time gap) are adjustable by the driver. This follow-up controller determines a desired acceleration from the above-mentioned variables. The desired acceleration is, however, limited by the desired acceleration of the road-speed control component so that the pregiven desired speed cannot be exceeded even in the follow-up control. Distance controllers and speed controllers provide desired values for the acceleration and deceleration, respectively, of the vehicle in dependence upon the operating state. These desired values are adjusted by influencing the engine of the vehicle and/or the brakes.

German patent publication 4,338,399 discloses a road-speed controller wherein a desired acceleration of the vehicle is computed on the basis of the difference between the desired and actual speeds. This computed desired acceleration serves as the basis of the vehicle control. The actual acceleration of the vehicle is controlled by controlling the engine and/or by actuating the wheel brakes of the vehicle in such a manner that it approaches the desired acceleration.

The configuration of a controller of this kind defines a compromise between rapid reaction to the input data and dragging reaction in order not to confuse the driver or make the driver insecure and/or to maintain comfort. For this reason, and as a rule, the acceleration and/or the acceleration change is significantly throttled compared to the possibilities of the vehicle. In this way, the acceleration and/or the change of the acceleration of the vehicle is limited; that is, it is not possible for the actual acceleration and/or acceleration change of the vehicle to exceed this limit. Accordingly, the vehicle does not accelerate faster than pregiven by the limit value. Here, the problem occurs that the acceleration dynamic of the controller often lies significantly below the expectation of the driver, for example, when the forward driver is highly accelerating or where there is a passing maneuver or a swerving maneuver.

SUMMARY OF THE INVENTION

It is an object of the invention to provide measures which improve the dynamic acceleration and/or deceleration for a road-speed control without making the driver insecure or reducing comfort.

The method of the invention is for controlling the road speed of a vehicle and includes the steps of: controlling the road speed in the context of a closed-loop control wherein an actual value is caused to approach a desired value; limiting a change of the road speed during the closed-loop control when there is a dynamic operating state; and, cancelling the limiting or setting the limiting to higher values in dependence upon the state of at least one switch element actuable by the driver. Depending upon the switching element, this limit value is either lifted so that an unlimited acceleration (that is, the maximum attainable by the vehicle) is inputted or a greater acceleration than the limit value is inputted.

The solution provided by the invention permits an intervention to increase the acceleration dynamic or deceleration dynamic of a road-speed control system. These terms describe the dynamic performance of the vehicle when the road speed control system is activated during the acceleration or deceleration.

It is especially advantageous that this intervention is carried out with an operator-controlled element actuable by the driver so that a confusing operation of the control system can be precluded. In this way, the driver is involved for changing the dynamic of the control system whereby a greater reliability for dynamic acceleration or deceleration is achieved.

It is especially advantageous to use the solution provided by the invention for a control system having follow-up control (ACC or adaptive cruise control). In addition to the normal driving mode, the driver can adjust a sporty driving mode with a control system of this kind. With the possibility for changing the limit value for the acceleration of the vehicle, the driver can exert influence on the dynamic performance of the control system. Thus, the driver can adjust to a sporty driving performance outside of the normal driving mode which is directed more toward a comfortable driving performance. In this sport mode, a higher acceleration or deceleration is permitted also when the road speed controller is active.

In a further embodiment of the road-speed controller with follow-up control, the limit values for the dynamic are changed in dependence upon the driver-type factor formed in a transmission control unit. It is the state of the art that a so-called driver-type factor is determined in the context of transmission control and, in dependence on this factor, the switching points of the automatic transmission can be changed. With respect to the types of drivers, one can at least distinguish between a sporty driver and a normal driver for whom a more comfortable adjustment of the transmission control is provided. In this way, the complexity is considerably reduced and the dynamic of the control system is automatically adapted to the driver performance. The driver-type factor is formed in one embodiment also by another unit (for example, the follow-up control unit).

BRIEF DESCRIPTION OF THE DRAWINGS

The invention will now be described with reference to the drawings wherein.

DESCRIPTION OF THE PREFERRED EMBODIMENTS OF THE INVENTION

The solution according to the invention is shown below with respect to a preferred application of an adaptive road-speed controller. The solution of the invention is however also realized in an advantageous manner in the context of additional embodiments of a road-speed control of a vehicle.

Figure 1:
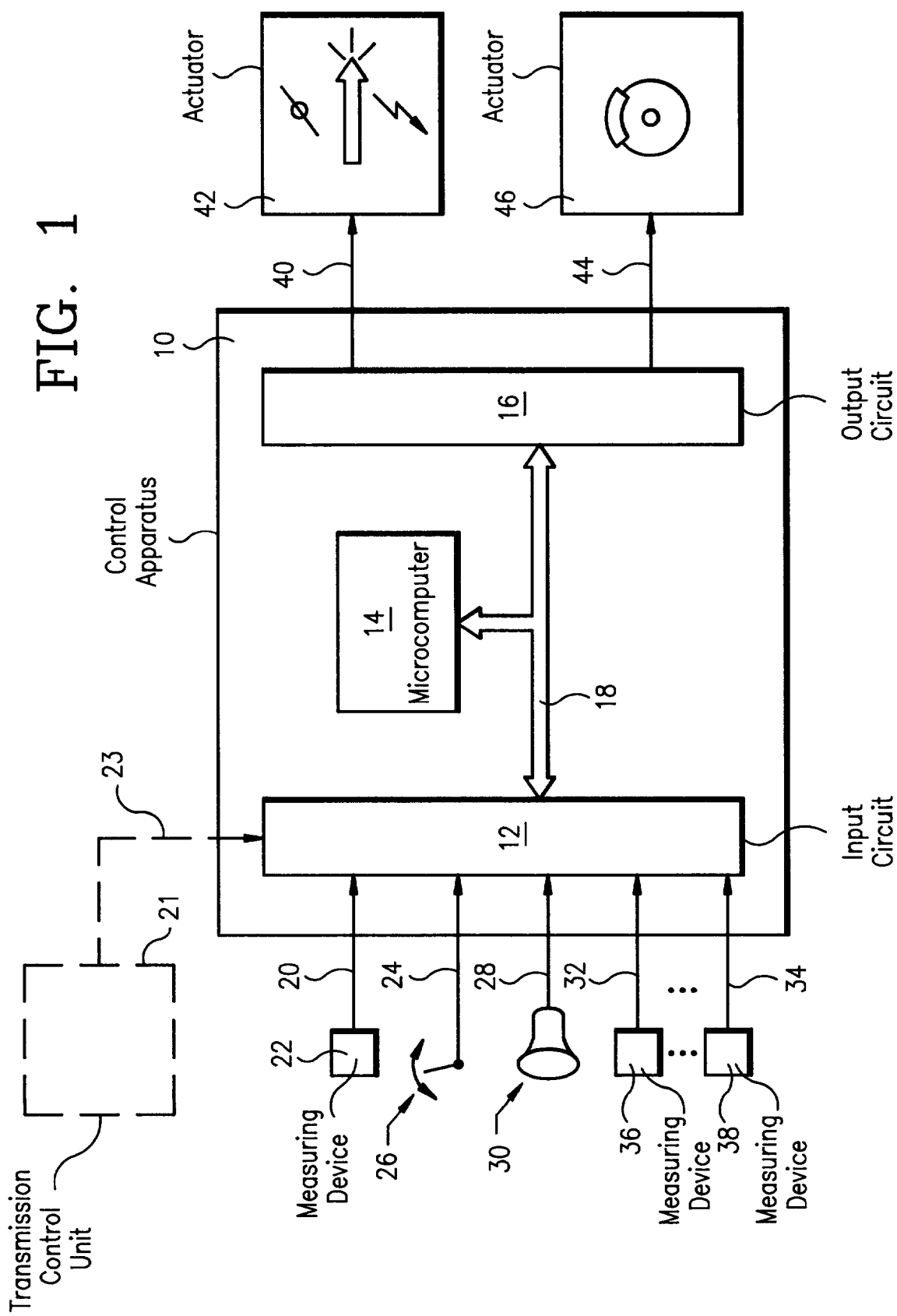
FIG. 1 is an overview block diagram of a control arrangement for controlling the road speed of a vehicle.

FIG. 1 is an overview block diagram of a control apparatus 10 for an adaptive road-speed controller. The control apparatus 10 includes an input circuit 12, at least one microcomputer 14 and an output circuit 16. These elements are interconnected by a communication system 18 for exchanging data and information. Input line 20 from a measuring device 22 for detecting the road speed is connected to the input circuit 12 as is a line 24 from an operator-actuated element 26 for inputting the operating state of the road-speed controller and the desired spacing. An input line 28 from a distance measuring device 30 such as a radar apparatus is also connected to the input circuit 12. Additional input lines 32 to 34 from measuring devices 36 to 38, respectively, for detecting additional operating variables of the vehicle are connected to input circuit 12. Operating variables of this kind are, for example, steering angle, transverse acceleration, et cetera. The microcomputer 14 of the control unit 10 influences the power of the drive unit of the motor vehicle in the context of an adaptive cruise control via at least an output line 40 and corresponding actuators 42 (for example, electronic motor control apparatus). Furthermore, and in a preferred embodiment, the control unit 10 influences the braking force at the wheel brakes of the vehicle via the output line 44 and corresponding actuators 46 (for example, of a braking system equipped with ABS/ASR elements). The term "ASR" stands for automatic slip control and is derived from the German word "Antriebsschlupfregelung".

Figure 2:
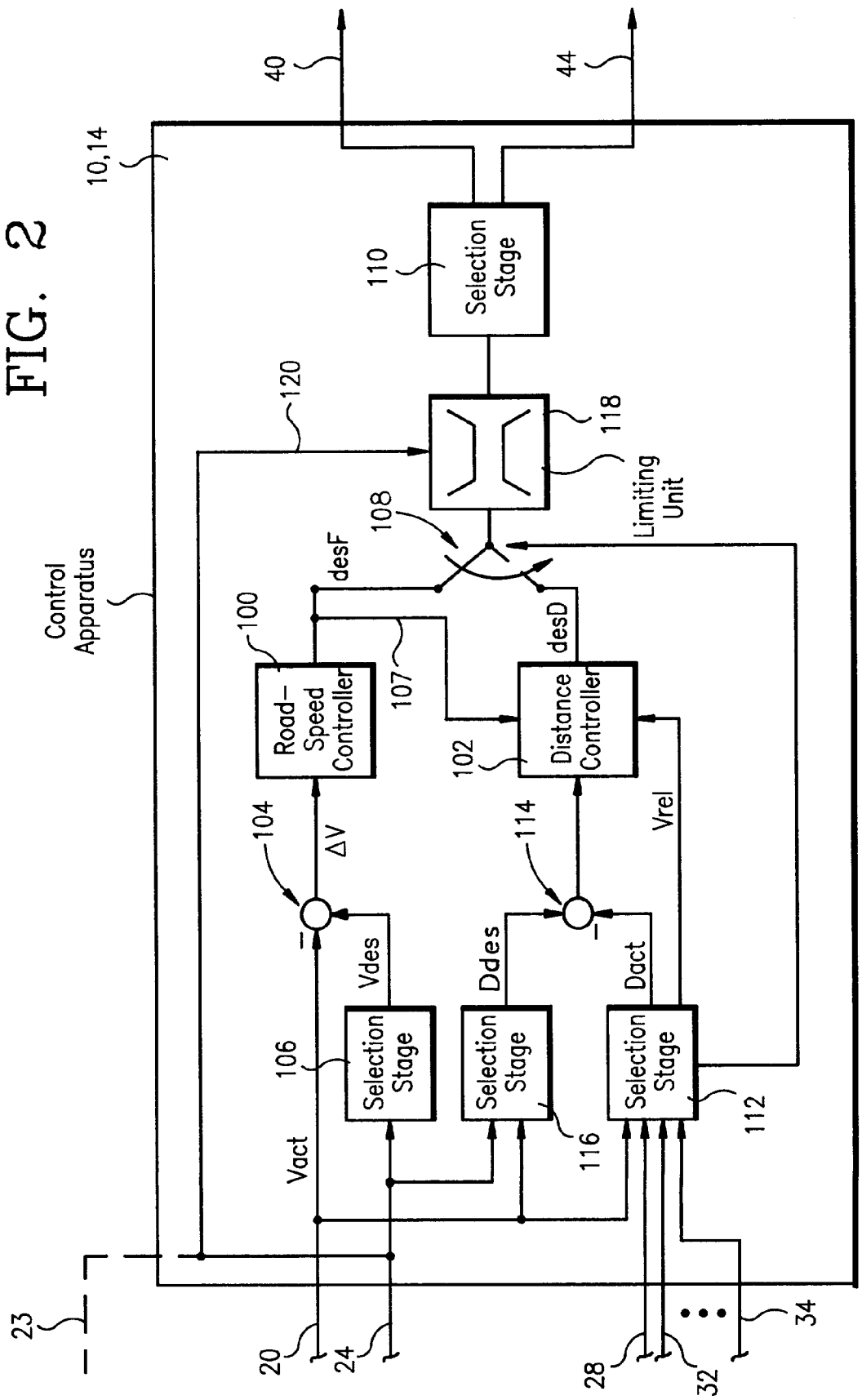
FIG. 2 is a detail view of an adaptive speed controller (road-speed controller having a distance controller); and, FIG. 3 shows an embodiment of the method of the invention in the context of a flowchart which defines a program executed in a microcomputer of the control apparatus.

The basic principle of adaptive cruise control known from the above-mentioned state of the art is shown in FIG. 2 in the context of a block circuit diagram which shows the basic relationships for an adaptive road-speed control. The realization of this road-speed control is achieved in the preferred embodiment as a program of the microcomputer 14 which realizes the relationships shown in FIG. 2.

The adaptive road-speed control shown includes two basic functions, namely, the road-speed controller 100 and the distance or follow-up controller 102. The road-speed controller 100 is realized in a conventional manner and is supplied from a comparator 104 with the difference $\Delta V$ between the desired speed $V_{des}$ and the actual speed $V_{act}$. The desired speed $V_{des}$ is determined in dependence upon the actuating state of the operator-controlled element 26 in a selection stage 106. Thus, for example in the operating state "set", the actual speed value is assumed as the desired speed and, in the operating state "acceleration", ramps of the desired speed which change as a function of time are pregiven. The output signal desF is formed by the road-speed controller 100 in dependence upon the speed difference in accordance with a pregiven control strategy (for example, PD or proportional differential control). The output signal desF is outputted to a switching element 108 and to the controller 102 via the line 107. Depending upon the switching position of the switching element 108, the output signal desF of the road-speed controller or the output signal desD of the follow-up controller 102 is conducted to a selection stage 110. The selection stage 110 forms a control signal for influencing the engine power (output line 40) and/or the braking force (output line 44) in dependence upon the supplied output signal.

The follow-up controller 102 includes a selection stage 112 which determines the relevant vehicle which is to be used as the forward vehicle for distance control. This is determined by the selection stage 112 in dependence upon the radar signals, which are supplied via the input line 28, the actual speed and variables such as steering angle, rate of yaw and acceleration of the vehicle. These variables are supplied via lines 32 to 34.

The course of the vehicle to be expected is determined, for example, based on the speed and on the steering angle. The radar sensor supplies the distance to the detected objects, their relative speed and the angle to the various objects so that the relevant vehicle is selected from a comparison of the supplied data to the expected future course of the vehicle. Then, the values determined by the radar sensor for the distance to the relevant vehicle $D_{act}$ and its relative speed $V_{rel}$ are outputted. The actual distance is supplied to a comparator stage 114 in which the difference is formed between the desired spacing $D_{des}$, which is pregiven by the driver, and the determined actual spacing and the difference is supplied to the follow-up controller 102. The relative speed is also transmitted to the follow-up controller 102 from the selection stage 112. The desired distance to the relevant forward vehicle is determined in a selection stage 116 in dependence upon an actuating signal of the driver, which fixes the desired time distance to the forward vehicle in seconds, and the actual speed. The follow-up controller 102 forms an output signal desD with which the distance difference as well as the relative speed of the forward vehicle are guided to zero. The desired quantity of the road-speed controller 100 is supplied to the follow-up controller 102 so that the pregiven desired speed cannot be exceeded. The output signal desD is supplied to the switch element 108. The switch element 108 is switched over into the position shown in phantom outline when a forward vehicle is detected and to which the spacing is to be adjusted. This means that the road-speed controller 100 determines engine power and brake power in accordance with its input quantities when no vehicle is determined for distance or range control; whereas, for a detected forward vehicle, the follow-up controller 102 controls engine power and braking power. The selection stage 110 decides whether the engine control or the brake control is activated in dependence upon the supplied desired value which corresponds essentially to a desired acceleration or deceleration. If the reduction of engine power is not sufficient to hold the desired deceleration, then the brakes are activated; otherwise, the deceleration control is carried out via a control of the engine power.

The desired value outputted to the selection stage 110 is limited in the limiting unit 118 to a maximum acceleration value or deceleration value. Furthermore, in another embodiment, the change of acceleration or the change of deceleration can be limited in addition or as an alternative.

The limit values pregiven in the limiting unit 118 are changeable in dependence upon the dynamic performance desired by the driver. Preferably, the limit values are increased for a desired sportier performance so that a greater maximum acceleration of the vehicle and/or a greater maximum change of acceleration and/or a greater maximum deceleration and/or maximum deceleration change is permitted. In another embodiment, the limit values are cancelled.

The command of the driver for a higher dynamic can be detected in different ways. The term "higher dynamic" is here understood to mean an improved acceleration and/or deceleration performance of the vehicle. Stated otherwise, the maximum limited acceleration of the vehicle and/or the maximum limited deceleration of the vehicle is greater when the driver sets a higher dynamic of the vehicle than in the normal operating mode. Preferably, at least one switch is provided which can be actuated by the driver. When this switch is actuated, the limit values are changed and, when the switch is released, the old limit values are restored.

In a preferred embodiment and for this purpose, at least one of the available operator-controlled switches (for example, a set switch or a switch for the desired time gap) is taken with a double function. For such an example, a line 120 is provided in FIG. 2. This line branches from line 24. If the driver actuates this switch in the manner provided, then the upper limit value for the acceleration or the change of acceleration is increased. After releasing this switch, these limit values drop to the old limit values either immediately or time delayed. If the corresponding limit values are influenced for the deceleration, then the corresponding signal is derived from another switch. In the above, a switch is described which the driver can actuate for increasing the limit values for the acceleration of the vehicle. In one embodiment, also the limit values for the deceleration of the vehicle can be changed by the driver so that the driver can change these limit values in this embodiment via a second switch.

In one embodiment, new switch elements are introduced for changing the limit values. When the switch elements are actuated, the limit values are increased and when the switches are released, the limit values are again reduced.

In another embodiment, and in lieu of the status of at least one of the available operator-controlled elements of the road-speed control system (in lieu of at least one of the new switch elements), the driver command with respect to a sportier type of driving is derived from a corresponding switch element of a transmission control unit 21 (or from the driver type factor determined from such a transmission control).

The return to the old limit values takes place in a preferred embodiment in a delayed manner and, in another embodiment, immediately.

The effect of the changed limit values is only clear when the road-speed control undertakes an acceleration, a change of acceleration, deceleration and/or change of deceleration, which is greater than the old limit values. As long as the vehicle dynamic moves below the old limit values, nothing changes with respect to the driving performance of the vehicle. In this context, the term "vehicle dynamic" is understood to mean the following: the acceleration of the vehicle, the deceleration of the vehicle, the change of acceleration thereof and/or the change of deceleration thereof. With these measures, the driving comfort is retained notwithstanding improved dynamic possibilities of the vehicle.

The driver can influence the acceleration performance and the deceleration performance of the vehicle during active control with the possibility of changing the limit values. For example, when the limit value for the acceleration of the vehicle is increased, then a greater acceleration of the vehicle is permitted. It is in this context that the dynamic of the vehicle is improved.

The solution of the invention is preferably realized as a program of a microcomputer. FIG. 3 shows a flowchart which is started at pregiven time intervals and defines a preferred realization of the solution of the invention.

In the first step 200, the stored desired speed Vdes, the actual speed Vact as well as the status of a driver-actuable switch element for dynamic increase are read in. In step 200 of FIG. 3, the status of the switch element is read in. When switching the switch element, the limit values for the acceleration are increased. For this reason, and as explained above, the dynamic of the vehicle is increased. In the next step 202, and in a manner known per se, the desired value desF, which is determined by the road-speed controller, is formed on the basis of the desired speed and the actual speed in accordance with measures of a pregiven control strategy.

In the preferred embodiment, this desired value is the desired acceleration value. In other embodiments, the desired value represents other operating variables such as a desired torque, a desired power, a desired air supply, et cetera. In step 204 following step 202, the operating variables, which are necessary to identify a possible forward vehicle and to detect the distance of this vehicle and the relative speed thereof, and signals of the radar apparatus are detected. In the next step 206, a check is made as to whether a forward vehicle has been detected. If this is not the case, then according to step 208, and in a manner similar to conventional road-speed control, the desired value DES (which is to be adjusted by the motor control or the brake control) is set to the desired value desF determined in step 202 by the road-speed controller.

If a forward vehicle is detected in accordance with step 206, then the follow-up control is enabled. Then, in step 210, the desired distance Ddes, which is pregiven via a time gap to the forward vehicle, the actual distance Dact as well as the relative speed Vrel of the forward vehicle are determined. Thereafter, in step 212, the desired value of the follow-up control desD is formed in accordance with a pregiven control strategy on the basis of the distance desired value Ddes, the distance actual value Dact as well as the relative speed Vrel. The relative speed is caused to approach the value 0 and the spacing is controlled to the desired spacing.

In the next step 214, the desired value desD, which is determined by the follow-up controller, is limited to the desired value desF determined by the road-speed controller in step 202 so that the adjusted desired speed cannot be exceeded by the distance controller. In the next step 216, the desired value DES, which is to be adjusted by the motor control or the brake control, is set to the desired value desD (which is determined by the follow-up controller and which can be limited as required). After steps 208 and 206, the maximum value MAX for the acceleration or deceleration of the vehicle is read out in step 218 in dependence upon the status of the switch element (which is actuable by the driver) from a pregiven table.

In the next step 220, the desired value DES is limited to this maximum value. This takes place in the preferred embodiment (in which the desired value represents an acceleration or deceleration) by limiting this desired value; whereas, in cases wherein the desired value represents another variable, the desired value is corrected in the sense of limiting the acceleration or deceleration of the vehicle to the maximum value. In the next step 222, the desired value is outputted to the brake control or motor control and the subprogram is ended and initiated anew at a pregiven time.

It is understood that the foregoing description is that of the preferred embodiments of the invention and that various changes and modifications may be made thereto without departing from the spirit and scope of the invention as defined in the appended claims.

What is claimed is:

1. A method for controlling the road speed of a first vehicle having controller means for controlling an operating variable of the first vehicle in a first operating situation wherein a second vehicle is forward of said first vehicle and said operating variable represents the distance to said second vehicle and a second operating situation wherein there is no second vehicle ahead of said first vehicle and said operating variable represents the road speed of said first vehicle, the method comprising the steps of:

- determining a desired value (Vdes, Ddes) pregiven by a driver of said first vehicle for said operating variable in dependence upon said first or second operating situation;
- determining an actual value (Vact, Dact) for said operating variable of said first or second situation;
- determining a driver-type factor defined by a driver-type factor signal;
- determining an output signal (DES) in dependence upon said desired value (Vdes, Ddes), said actual value (Vact, Dact) and said first or second operating situation;
- determining a limit value (MAX) in dependence upon said driver-type factor signal;
- limiting said output signal (DES) to the limit value (MAX) when said output signal (DES) exceeds said limit value (MAX); and,
- outputting said output signal (DES) to drive an actuator for influencing the acceleration and/or deceleration of said first vehicle.

2. The method of claim 1, comprising the further step of assuming a previous value of said limit value (MAX) when said switch is reset.

3. The method of claim 1, wherein said controller means includes at least one of: a distance closed-loop control which controls the distance of said first vehicle from said second vehicle to a desired value pregiven by the driver; and, a conventional road speed closed-loop control.

4. The method of claim 1, wherein said driver-type factor signal is derived from at least one switch element actuable by said driver.

5. An arrangement for controlling the road speed of a first vehicle having controller means for controlling an operating variable of the first vehicle in a first operating situation wherein a second vehicle is forward of said first vehicle and said operating variable represents the distance to said second vehicle and a second operating situation wherein there is no second vehicle ahead of said first vehicle and said operating variable represents the road speed of said first vehicle, the arrangement comprising:

- means for determining a desired value (Vdes, Ddes) pregiven by a driver of said first vehicle for said operating variable in dependence upon said first or second operating situation;
- means for determining an actual value (Vact, Dact) for said operating variable of said first or second situation;
- means for determining a driver-type factor defined by a driver-type factor signal;
- means for determining an output signal (DES) in dependence upon said desired value (Vdes, Ddes), said actual value (Vact, Dact) and said first or second operating situation;
- means for determining a limit value (MAX) in dependence upon said driver-type factor signal;
- means for limiting said output signal (DES) to the limit value (MAX) when said output signal (DES) exceeds said limit value (MAX); and,
- means for outputting said output signal (DES) to drive an actuator for influencing the acceleration and/or deceleration of said first vehicle.

* * * * *